United States Patent [19]

Kobayashi et al.

[11] Patent Number: 5,083,988

[45] Date of Patent: Jan. 28, 1992

[54] CENTRAL DIFFERENTIAL FOR A FOUR-WHEEL DRIVE MOTOR VEHICLE

[75] Inventors: Toshio Kobayashi, Tokyo; Hiroshi Yamashita, Mitaka, both of Japan

[73] Assignee: Fuji Jukogyo Kabushiki Kaisha, Tokyo, Japan

[21] Appl. No.: 546,520

[22] Filed: Jun. 29, 1990

[30] Foreign Application Priority Data

Jul. 29, 1989 [JP] Japan ................................. 1-199134

[51] Int. Cl.$^5$ .............................................. F16H 1/42
[52] U.S. Cl. ...................................... 475/249; 475/87; 475/89; 475/344; 180/249
[58] Field of Search ................. 180/248, 249; 192/103 F; 475/84, 86, 87, 89, 91, 118, 121-123, 125, 225, 248, 249, 257, 344

[56] References Cited

U.S. PATENT DOCUMENTS

| | | | |
|---|---|---|---|
| 4,466,502 | 8/1984 | Sakai | 180/247 |
| 4,481,877 | 11/1984 | Takano et al. | 192/0.032 X |
| 4,523,495 | 6/1985 | Sala | |
| 4,691,593 | 9/1987 | Mueller | 475/113 |
| 4,779,487 | 10/1988 | Pitsch et al. | 475/53 |
| 4,864,893 | 9/1989 | Hori | 475/344 X |
| 4,882,950 | 11/1989 | Gausrab et al. | 475/260 |

FOREIGN PATENT DOCUMENTS 63-176728 7/1988 Japan.

Primary Examiner—Leslie A. Braun
Assistant Examiner—Benjamin Levi
Attorney, Agent, or Firm—Martin A. Farber

[57] ABSTRACT

A central differential is composed of a planetary gear device. The planetary gear device comprises a first sun gear connected to an output shaft of a transmission, a carrier, a pinion set comprising first and second planetary pinions integral with each other and rotatably supported on the carrier, and a second sun gear. The first planetary pinion is engaged with the first sun gear, and the second planetary pinion is engaged with the second sun gear. The first and second planetary pinions are in the same phase, and a plurality of the pinion sets are equiangularly disposed around the first and second sun gears.

5 Claims, 5 Drawing Sheets

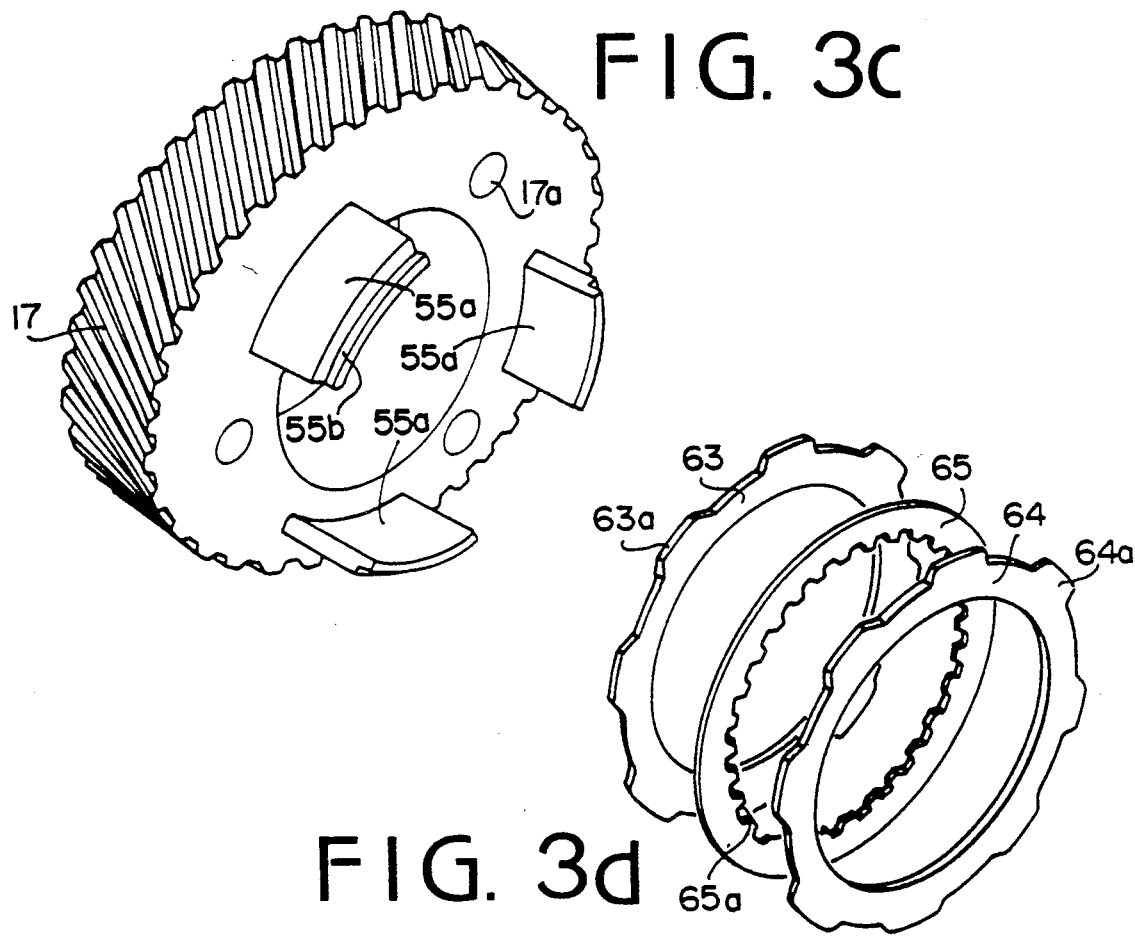
FIG. 3c
FIG. 3d
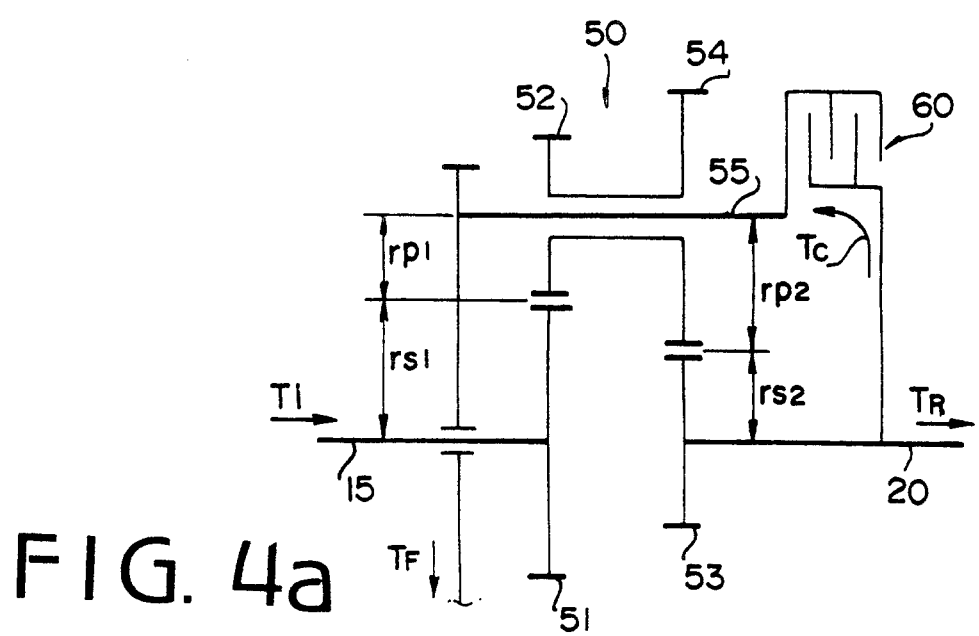
FIG. 4a

CENTRAL DIFFERENTIAL FOR A FOUR-WHEEL DRIVE MOTOR VEHICLE

BACKGROUND OF THE INVENTION

The present invention relates to a central differential for a four-wheel drive motor vehicle, and more particularly to the structure of the central differential.

In a four-wheel drive motor vehicle, a theoretical torque split of the front wheels and rear wheels of the vehicle is determined in accordance with a dynamic weight distribution of the front and rear wheels, considering the movement of the center of gravity of the vehicle at acceleration so that the power of the engine may be used most effectively.

In the four-wheel drive vehicle with a front-mounted engine, which was developed from a front-wheel front-drive type, the ratio of front torque $T_F$ to the front wheels and rear torque $T_R$ to the rear wheels are in the ratio of 50:50. In the four-wheel drive vehicle with a front-mounted engine, which was developed from a front-wheel rear-drive type, the front torque $T_F$ and the rear torque $T_R$ are in the ratio of 40:60. The central differential comprising bevel gears is employed in the former system in which the output torque of the engine is equally distributed, and the central differential having a simple planetary gear device is employed in the latter system.

The former system ensures safe driving on a slippery road. If a differential lock device is provided for locking the central differential, the driveability of the vehicle is improved further. However, when the vehicle makes a turn at high speed under the differential lock condition, all of the four wheels may slip (slipping spin) at the same time, causing difficulty in driving.

In order to ensure driving stability of the vehicle, the torque to the rear wheels is set to a value larger than that to the front wheels by arranging the central differential comprising the simple planetary gear device, so that the rear wheels may slip first. Thus, cornering performance is improved by the front wheels at a small torque while the rear wheels idle.

Japanese Patent Application Laid-Open 63-176728 discloses a four-wheel drive motor vehicle in which a central differential comprising a simple planetary gear device is provided. The output of a transmission is transmitted to a carrier of the planetary gear device. The torque is distributed to the front wheels through either a sun gear or a ring gear and to the rear wheels through the other gear. The torque to the front and rear wheels is unequally distributed at a ratio determined by the difference between pitch circles of a sun gear and a ring gear. A fluid operated multiple-disk friction clutch as a lock device is provided for controlling the differential operation.

U.S. Pat. 4,523,495 discloses a central differential comprising a double-pinion planetary gear device for the four-wheel drive motor vehicle. In the system, a final reduction gear of a transmission is used for a carrier of the differential. The differential has three pairs of double pinions. Each pinion is rotatably mounted on a shaft secured to the carrier. One of each pair of pinions is engaged with a sun gear formed on a differential case of an axle differential for a front-wheel, and the other pinion is engaged with a sun gear for transmitting the power to the rear wheels.

Meanwhile, in the four wheel drive vehicle developed from a rear-wheel drive vehicle with a front-mounted engine and in the four wheel drive vehicle developed from a front-wheel drive vehicle with a front-mounted engine, the central differential is mounted in the rear of the transmission. Consequently, the space in the vehicle is reduced by the central differential, which affects room (space) and design for mounting various equipment. Therefore, it is necessary to reduce the size of the planetary gear device of the central differential. Generally, in order to reduce the size, the diameter of the pinion is reduced. In such a case, a plurality of pinions, for example three and four, are provided for dispersing the load exerted on the teeth surfaces of the pinions.

When the planetary gear device having a plurality of pinions is used, conditions of engagement of the pinions and the number of teeth of each pinion should be determined, so that the pinions may be disposed at equiangular disposition. In the simple planetary gear device, if the number of the pinions to be used is n, the number of teeth of a ring gear is $Z_R$, and the number of teeth of a sun gear is $Z_S$, and for evenly spaced pinions the equation is determined as follows.

$$m = (Z_R + Z_S)/n$$

(m is an arbitrary integer)

In the double-pinion planetary gear device, if the number of the double pinions to be used is n, and the number of teeth of two pinions are $Z_{s1}$ and $Z_{s2}$, respectively, and for evenly spaced pinions the equation is determined as $$m = (Z_{s1} + Z_{s2})/n$$

(m is the arbitrary integer)

Further, in the double-pinion planetary gear device system, the pinions of each pair are disposed adjacent each other and engaged with each other. Consequently, it is necessary for have the basic conditions of the pinions such as module, pressure angle and helix angle to coincide with each other. Accordingly, the design variation is limited by the basic conditions.

In the system having the simple planetary gear device, the theoretical torque split determined by the ratio of the pitch circles can not be changed, unless the diameters of the sun gear and the ring gear change. In the double-pinion planetary gear device, the theoretical torque split can not be changed, unless the diameters of the sun gears change. However, it is difficult to change the diameters because of the limitation of space. Thus, the range of the theoretical torque split can not be widely expanded.

If the number of the teeth is determined in accordance with the theoretical torque split regardless of the above described engagement conditions, pinion couples are disposed at irregular angular spaces.

In the system of the double-pinion planetary gear device, the central differential is coupled with the final gear, thereby reducing the size. However, a differential lock device must be provided separately from the central differential, so that the whole system becomes large in size. Since the final gear is cantilevered to support the central differential, the final gear is subject to be tilted. This will generate noise, and a reduced durability of the gears and bearings.

SUMMARY OF THE INVENTION

An object of the present invention is to provide a torque distribution system for a four-wheel drive motor vehicle in which the design range of the theoretical torque split to the front wheels and rear wheels can be increased Another object of the invention is to provide a central differential in which the number of teeth and the mesh conditions of the planetary set are determined, thereby enabling the equiangular disposition of a plurality of pinions.

Still another object of the invention is to provide the central differential which may be reduced in size, thereby improving the entire durability and reliability of the torque distribution system.

Other objects and features of this invention will become understood from the following description with reference to the accompanying drawings.

BRIEF DESCRIPTION OF DRAWINGS

FIG. 3b is a side view of the drum of FIG. 3a;

FIG. 3c is a perspective view showing the carrier provided in the central differential;

FIG. 3d is a perspective view of disks and a retainer of the clutch;

FIG. 4a is a schematic view showing the central differential; and

DETAILED DESCRIPTION OF THE PREFERRED EMBODIMENTS

Figure 1:
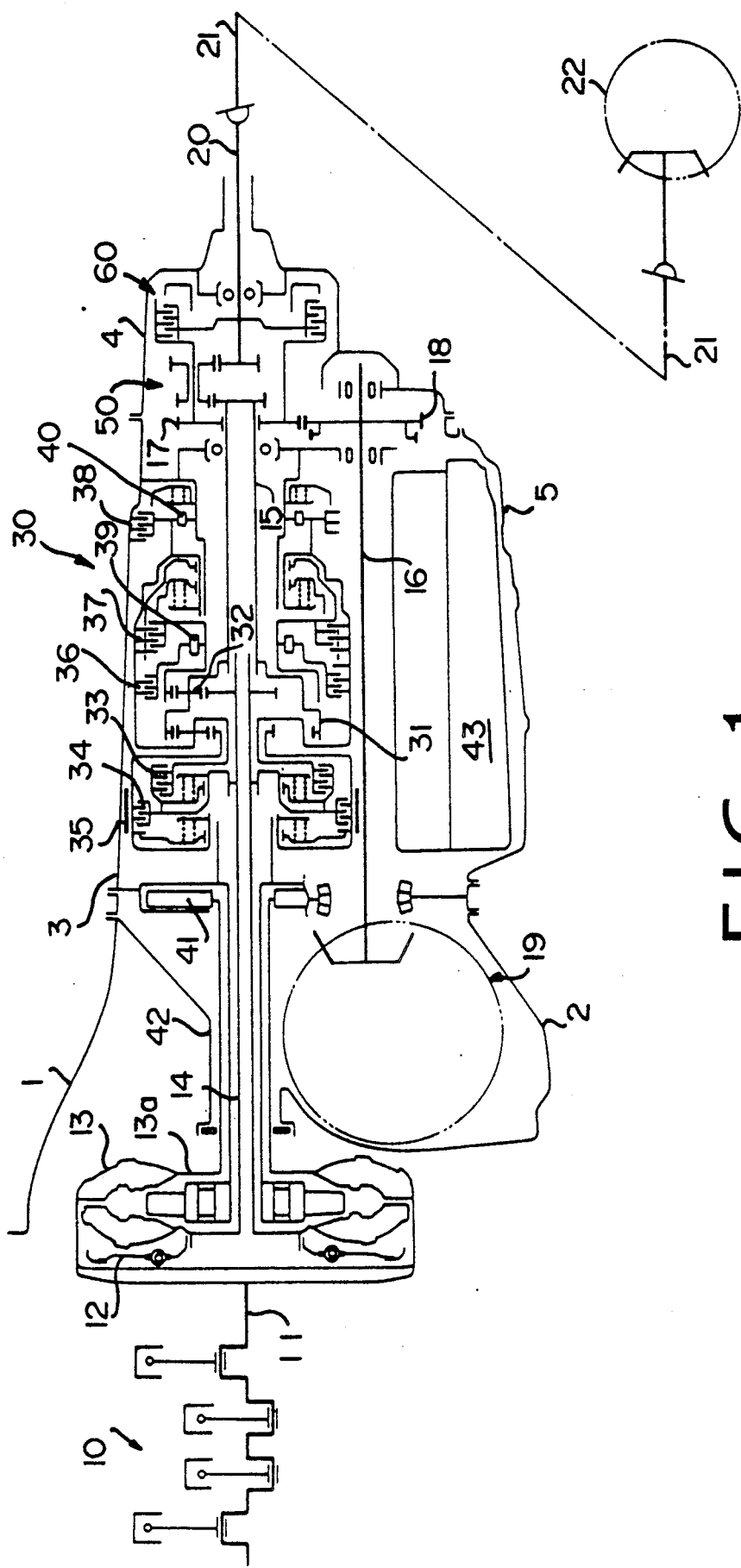
FIG. 1 is a schematic diagram showing a power transmission system for a four-wheel drive motor vehicle according to the present invention.

FIG. 1 shows a power transmission system in a transaxle type for a four-wheel drive motor vehicle having an engine 10 at a front portion thereof. The power transmission system has a torque converter 13 with a lockup clutch 12 mounted in a converter box 1, and a front differential 19 mounted in a differential box 2 behind the torque converter 13. A transmission case 3 housing an automatic transmission 30 is attached to the rear of the differential box 2. An oil pan 5 is attached to an underside of the transmission case 3. A crankshaft 11 of the engine 10 is operatively connected with the torque converter 13. An input shaft 14 extends from a turbine of the torque converter 13 to the automatic transmission 30. The output of the automatic transmission 30 is transmitted to an output shaft 15 which is aligned with the input shaft 14 for rearwardly transmitting the torque. The output shaft 15 is connected to a front drive shaft 16 which is disposed in parallely under the automatic transmission 30 through a pair of reduction gears 17 and 18 of a central differential 50 housed in a transfer case 4. The front drive shaft 16 is connected to front wheels (not shown) of the vehicle through a front differential 19. The output shaft 15 is connected to a rear drive shaft 20 through the central differential 50. The rear drive shaft 20 is connected to rear wheels (not shown) of the vehicle through a propeller shaft 21 and a rear differential 22. A fluid operated multiple-disk friction clutch 60 is provided in the central differential 50. The automatic transmission 30 comprises two sets of single planetary gears consisting of a front planetary gear 31 and a rear planetary gear 32 for providing four forward speeds and one reverse speed. The automatic transmission has a high clutch 33, a reverse clutch 34, a brake band 35, a forward clutch 36, an overrunning clutch 37, a low and reverse clutch 38, and one-way clutches 39 and 40.

An oil pump 41 is provided in the front end of the transmission case 3. A pump drive shaft 42 is connected to an impeller 13a of the torque converter 13 and is operatively connected with a rotor of the oil pump 41.

In the oil pan 5, a control valve body 43 is provided for hydraulically actuating the respective clutches and brake of the transmission 30.

Figure 2:
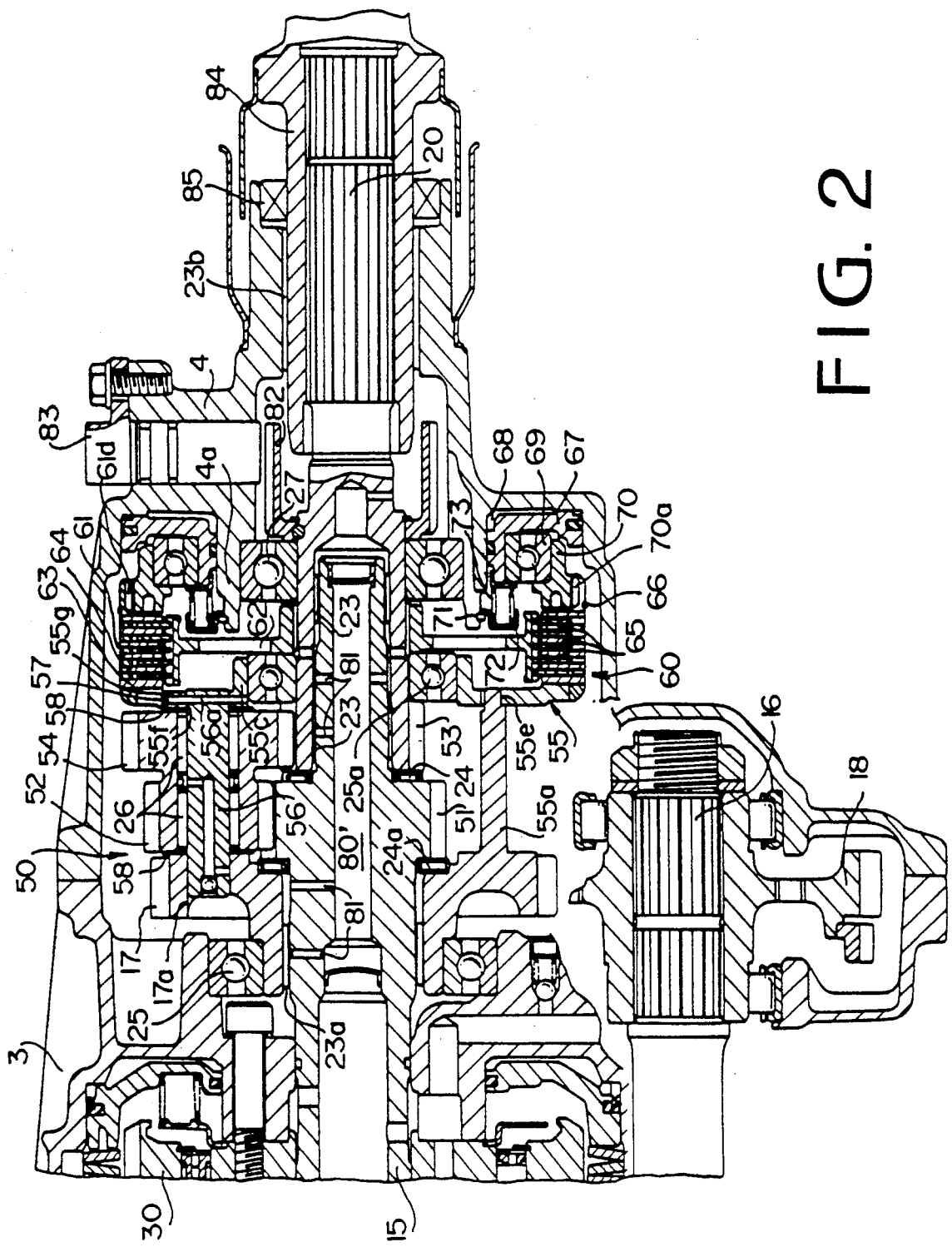
FIG. 2 is an enlarged sectional view showing a central differential of the system.
Figure 3A:
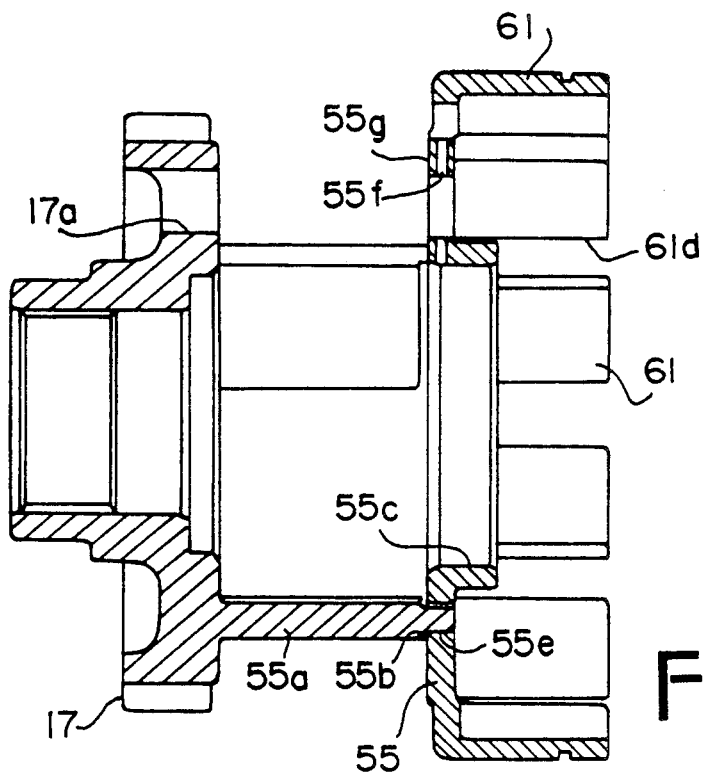
FIG. 3a is a sectional view showing a reduction gear, a carrier, and a drum of a fluid operated multiple-disk friction clutch.
Figure 3B:
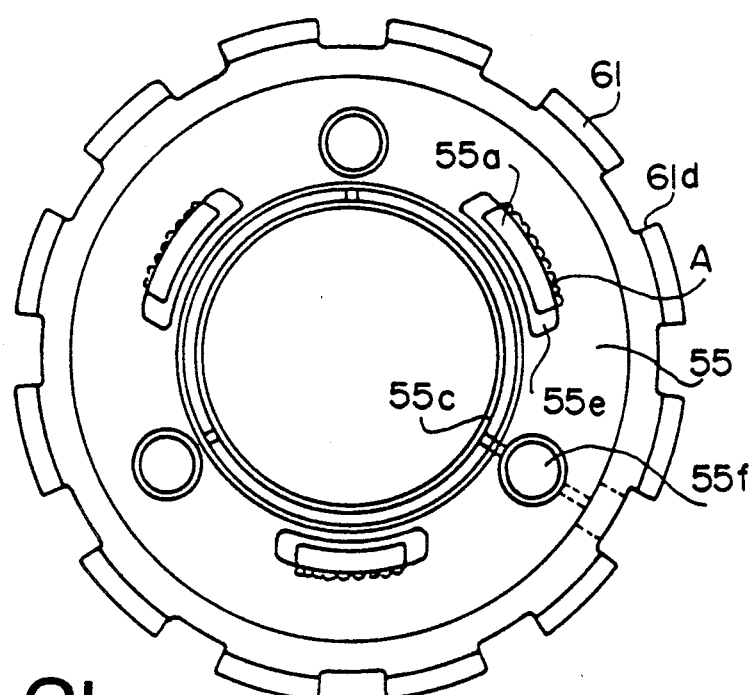

Referring to FIG. 2 showing the central differential 50, an end of the rear drive shaft 20 is rotatably mounted on the output shaft 15 through a pair of needle bearings 23 and a thrust bearing 24. The reduction gear 17 is rotatably mounted on the output shaft 15 through a needle bearing 23a and a thrust bearing 24a. A planetary gear device of the central differential 50 is disposed between the output shaft 15, reduction gear 17 and rear drive shaft 20.

The central differential 50 is a complex planetary gear device which comprises a first sun gear 51 formed on the output shaft 15, a first planetary pinion 52 meshed with the first sun gear 51, a second sun gear 53 formed on the rear drive shaft 20, a second planetary pinion 54 meshed with the second sun gear 53, and a carrier 55. The first and second planetary pinions 52 and 54 are integral with each other to form a pinion set and supported on a shaft 56 through needle bearings 26. The shaft 56 is secured to the gear 17 and the carrier 55. A boss of the reduction gear 17 is supported in the transmission case 3 through a bearing 25. The carrier 55 has a boss 55c which is rotatably mounted on the rear drive shaft 20 through a bearing 25a.

Thus, the output torque from the output shaft 15 of the transmission 30 is transmitted to the carrier 55 and the second sun gear 53 through the first sun gear 51 and pinions 52, 54 at predetermined respective torque distribution ratios. The difference between the rotating speeds of the carrier 55 and the second sun gear 53 is absorbed by the rotation and revolution of the first and second planetary pinions 52 and 54. In the central differential, three pinion sets are provided as described hereinafter.

The operation of the central differential 50 for distributing the torque to the front wheels and the rear wheels will be described hereinafter with reference to FIG. 4a.

Input torque Ti of the first sun gear 51 and the relationship between the sun gears and the pinions are expressed as follows, respectively.

$$Ti = T_F + T_R \qquad (1)$$

$$rs_1 + rp_1 = rs_2 + rp_2 \qquad (2)$$

where $T_F$ is a front torque transmitted from the carrier 55 to the front drive shaft 16, $T_R$ is a rear torque transmitted from the second sun gear 53 to the rear drive shaft 20, $rs_1$ is a pitch circle radius of the first sun gear 51, $rp_1$ and $rp_2$ are the pitch circle radii of the first and second pinions 52 and 54, respectively, and $rs_2$ is the radius of the pitch circle of the second sun gear 53.

A tangential load P on the engaging point of the first sun gear 51 and the first pinion 52 is equal to the sum of a tangential load $P_1$ on the carrier 55 and a tangential load $P_2$ on the engaging point of the second sun gear 53 and the second pinion 54. That is, $$P = T_i/r_{s_1}$$

$$P_1 = T_F/(r_{s_1} + r_{p_1})$$

$$P_2 = T_R/r_{s_2}$$

$$T_i/r_{s_1} = \{(T_F/(r_{s_1} + r_{p_1}))\} + T_R/r_{s_2} \tag{3}$$

Substituting equations (1) and (2) for the equation (3), $$T_F = (1 - r_{p_1} \cdot r_{s_2}/r_{s_1} \cdot r_{p_2}) \cdot T_i \tag{4a}$$

$$T_R = (r_{p_1} \cdot r_{s_2}/r_{s_1} \cdot r_{p_2}) \cdot T_i \tag{4b}$$

Consequently, it will be seen that a theoretical torque split to the front torque $T_F$ and the rear torque $T_R$ can be set to various values by changing the radii of the pitch circles of the sun gears 51 and 53 and the pinions 52 and 54.

The engagement conditions for equiangularly disposing a plurality of pinions will be described with reference to FIGS. 4b and 4c.

Figure 4B:
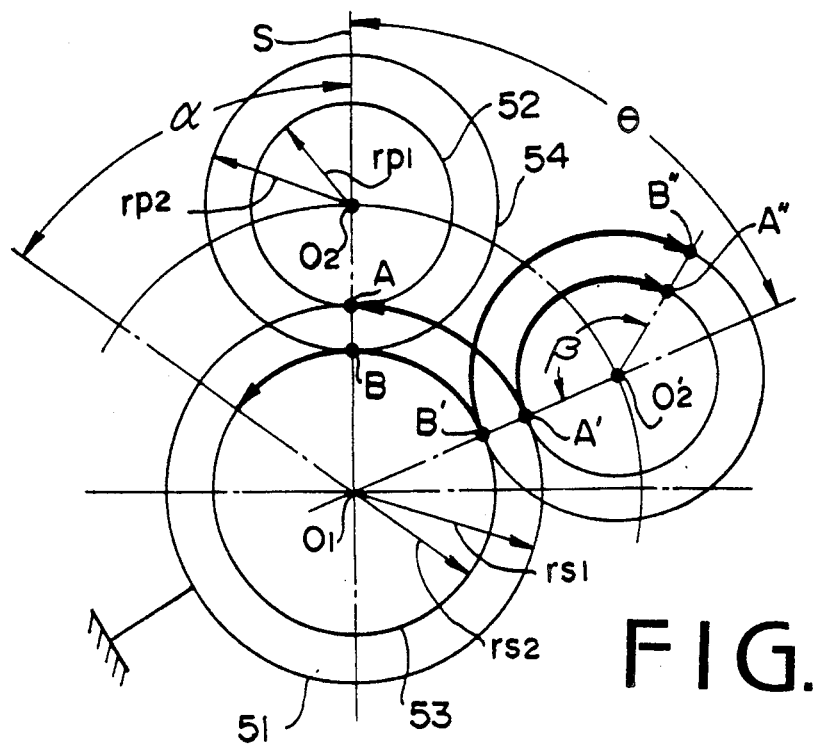
FIGS. 4b and 4c are explanatory illustrations showing engagement of pinions.

Referring to FIG. 4b, if the first sun gear 51 is fixed and the first and second pinions 52 and 54 are revolved at an angle $\theta$ in the clockwise direction from a standard line S, the second sun gear 53 is rotated by an angle $\alpha$ in a counterclockwise direction. The angle $\theta$ is expressed as follows.

$$\theta = r_{s_2} \cdot r_{p_1} \cdot \alpha / (r_{s_1} \cdot r_{p_1} - r_{s_2} \cdot r_{p_1}) \tag{5}$$

If the number of teeth of the first sun gear 51 is $Z_{s_1}$, the number of the teeth of the second sun gear 53 is $Z_{s_2}$, the number of the teeth of the first pinion 52 is $Z_{p_1}$, and the number of the teeth of the second pinion 54 is $Z_{p_2}$, the equation (5) is substituted as follows in accordance with the numbers of teeth.

$$\theta = Z_{s_2} \cdot Z_{p_1} \cdot \alpha / (Z_{s_1} \cdot Z_{p_2} - Z_{s_2} \cdot Z_{p_1}) \tag{6}$$

If the second sun gear 53 is rotated by a circular pitch angle $360/Z_{s_2}$ from the standard line, the angle $\theta$ is represented as $$\theta = Z_{p_1} \cdot 360/(Z_{s_1} \cdot Z_{p_2} - Z_{s_2} \cdot z_{p_1}) \tag{7}$$

Figure 4C:
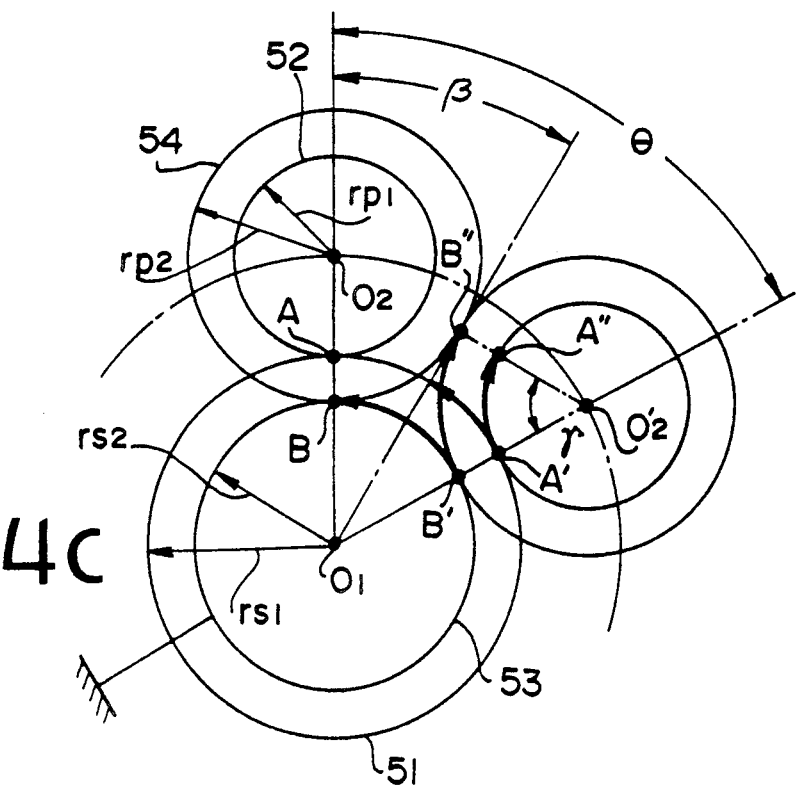

Referring to FIG. 4c, if the second sun gear 53 is fixed and the first and second pinions 52 and 54 are revolved by the angle $\theta$, the first sun gear 51 is rotated by an angle $\beta$ in the clockwise direction. The angle $\theta$ is expressed as $$\theta = -Z_{s_1} \cdot Z_{p_2} \cdot \beta / (Z_{s_1} \cdot Z_{p_2} - Z_{s_2} \cdot Z_{p_1}) \tag{8}$$

Substituting $\beta = 360/Z_{s_1}$ in the equation (8), $$\theta = -Z_{p_2} \cdot 360/(Z_{s_1} \cdot Z_{p_2} - Z_{s_2} \cdot Z_{p_1}) \tag{9}$$

If a number N of the pinions are equiangularly disposed, the disposition angle between a first pair of the pinions and a second pair of the pinions is $360/N$. It will be seen that integer times of a value is obtained by integrally multiplying the Number N with the equations (7) and (9). Consequently, for evenly spaced pinions the equation is $$\begin{aligned} m &= (Z_{s_1} \cdot Z_{p_2} - Z_{s_2} \cdot Z_{p_1})/Z_{p_1} \cdot N \\ &= -(Z_{s_1} \cdot Z_{p_2} - Z_{s_2} \cdot Z_{p_1})/Z_{p_2} \cdot N \end{aligned} \tag{10}$$

(m is an arbitrary integer)

The number of the teeth of each pinion is obtained from the equation (10). If $Z_{p_1} = Z_{p_2}$, the equation is simplified as follow.

$$m = |(Z_{s_1} - Z_{s_2})N| \tag{11}$$

It will be seen that the difference between the number of teeth of the first sun gear 51 and the number of teeth of the second sun gear 53 is integrally multiplied by the number N of the pinion set of the first and second pinions 52 and 54. If the module $m_1$ of the first pinion 52 and the module $m_2$ of the second pinion 54 is $m_2 > m_1$ even if the number of the teeth is $Z_{p_1} = Z_{p_2}$, the pitch circles become $r_{p_1} < r_{p_2}$.

Here, $Z_{s_1}$ is 24, $Z_{p_1}$ and $Z_{p_2}$ are 18, respectively, $Z_{s_2}$ is 15, and N is 3. If helical gears are used, and the module of each of the teeth $Z_{s_1}$ and $Z_{p_1}$ is 1.5, the module of each of the teeth $Z_{p_2}$ and $Z_{s_2}$ is 1.75 and if $r_{s_1}$ is 22.8 mm, $r_{p_1}$ is 17.1 mm, $r_{p_2}$ is 21.8 mm and $r_{s_2}$ is 18.1 mm, the equation (11) becomes $$m = (24 - 15)/3 = 3$$

Consequently, the three pinion sets, in which the first and second pinions 52 and 54 of each pair are in the same phase with each other, can be equiangularly disposed.

Substituting these figures in the equations (4a) and (4b), the front torque $T_F$ and the rear torque $T_R$ are calculated as $T_F = 0.377 T_i$ $T_R = 33/53 T_i$ Thus, the torque split of the front wheels and the rear wheels is $T_F : T_R = 38:62$ A large theoretical torque split can be distributed to the rear wheels.

The structure of the central differential 50 and the clutch 60 will be described hereinafter with reference to FIGS. 2, 3a to 3c in detail.

The carrier 55 is connected to the reduction gear 17 by three carrier connecting members 55a projected from the gear 17 as shown in FIG. 3c. Each of the connecting members 55a has a step portion 55b formed on a projected end part thereof for positioning the carrier 55. The reduction gear 17 has three holes 17a formed between the connecting members 55a.

Further, the carrier 55 is integral with a drum 61 of the clutch 60. The drum 61 has a plurality of slits 61d formed in the axial direction thereof at equidistant spaces for supporting disks and a retainer of the clutch 60.

The carrier 55 has three elongated slits 55e corresponding to connecting member 55a of the reduction gear 17 and three holes 55f formed between the slits 55e corresponding to the holes 17a of the reduction gear 17.

The step portions 55b of the connecting members 55a are inserted into the corresponding elongated slits 55e of the carrier 55. The step portion 55b is secured to the carrier 55 (by electronic beam welding) as shown by a mark A of FIG. 3b, so that the reduction gear 17 and the carrier 55 are centered with each other. Three shafts 56 are inserted into the corresponding holes 17a and 55f, respectively. A lock pin 57 is inserted into a hole 55g formed in the carrier 55 and a hole 56a formed in the shaft 56 by press fit, so that the shaft 56 is secured to the carrier 55. Washers 58 are provided between the first pinion 52 and the reduction gear 17 and between the second pinion 54 and the carrier 55.

In the central differential 50, three pinion sets of the first and second pinions 52 and 54 are equiangularly disposed between the reduction gear 17 and the carrier 55.

The clutch 60 comprises the drive drum 61 secured to the carrier 55, a driven drum 62 splined on the rear drive shaft 20, a plurality of disks 64 splined on the drum 61, and a plurality of disks 65 splined on the drum 62, alternately arranged. A retainer 63 abuts innermost on the disk 65.

As shown in FIG. 3d, each of the retainer 63 and the disk 64 has a plurality of engaging projections 63a and 64a formed on the outer peripheries thereof. Each of the engaging projections 63a and 64a engages with each of the axial slits 61d of the drum 61. The disk 65 has splines 65a formed on the inner periphery thereof to be splined with a hub of the drum 62. A clip 66 is provided for preventing the disks 65 from removing. A piston 67 is slidably mounted between the transfer case 4 and a boss 4a of the transfer case 4. The boss 4a is mounted on the rear drive shaft 20 through a bearing 27. An oil chamber 68 is formed between the piston 67 and the transfer case 4. A pressure plate 70 is connected to the piston 67 through a bearing 69 and engaged with the drum 61. Outer projections 70a of the pressure plate 70 are engaged with the slits 61d of the drum 61. A retainer 72 is secured to the boss 4a through a snap ring 71. A return spring 73 is provided between the retainer 72 and the piston 67. Thus, the clutch 60 is provided between the carrier 55 and the second sun gear 53 so as to change the torque distribution ratio and to lock the central differential 50.

When the pressure of oil in the oil chamber 68 is zero, the return spring 73 pushes the piston 67 to disengage the clutch 60. Thus, no clutch torque is produced.

When oil is supplied to the chamber 68, the piston 67 is pushed by the pressure of the oil. The pressure plate 70 pushes the disks 64 and 65 to engage the clutch 60 for producing a clutch torque.

The lubricating oil is fed to an oil passage 80 formed in the output shaft 15 and to oil ports 81 communicated with the passage 80 for lubricating needle bearings 23, 23a, thrust bearings 24, 24a, sun gear 51, 53, pinions 52, 54 and disks of the clutch 60. A rear-wheel speed sensor 83 is mounted on the transfer case 4 so as to dispose a pickup adjacent to a pulse gear 82 secured to the rear drive shaft 20 for detecting rear-wheel speed.

A sleeve 84 is splined with the rear drive shaft 20 and mounted in the transfer case 4 through a needle bearing 23b. An oil seal 85 is provided between the transfer case 4 and the sleeve 84.

Describing the operation of the system, the power of the engine 10 is transmitted through the torque converter 13 and the input shaft 14 to the transmission 30 at which the transmission ratio is automatically controlled. The output of the transmission is transmitted to the first sun gear 51 of the central differential 50. The front torque $T_F$ and the rear torque $T_R$ are determined in accordance with the radii of the gears of the central differential 50. The torque is transmitted to the reduction gear 17 through the carrier 55 at a ratio, for example 38% and to the second sun gear 53 at the ratio, for example 62%.

A slip ratio S is calculated in accordance with front-wheel speed $N_F$, rear-wheel speed $N_R$, and steering angle $\psi$. When the slip ratio S is $S \geq 1$, which means that the rear wheels do not slip, the clutch pressure is set to zero, thereby draining the oil in the clutch 60. The clutch 60 is disengaged and the clutch torque becomes zero so as to render the central differential 50 free.

Accordingly, the torque of the reduction gear 17 is transmitted to the front wheels through the reduction gear 18, the front drive shaft 16 and the front differential 19 at the ratio 38%. The torque at the distribution ratio of 62% is transmitted to the rear wheels through the second sun gear 53, the rear drive shaft 20, the propeller shaft 21 and the rear differential 22. Thus, a full-time four-wheel driving is established.

At the theoretical torque split, the vehicle is driven under an understeering condition, so that good operability is ensured. Further, when the vehicle makes a turn, the rotating difference in the speeds of the front and rear wheels is absorbed by the rotation and revolution of the first and second pinions 52 and 54, so that the vehicle smoothly negotiates a sharp corner due to the differential operation of the central differential 50.

If the vehicle is driven on a slippery road, the rear wheels slip first because the larger amount of the torque is distributed to the rear wheels. The slip ratio S1 (S<1) is calculated. A clutch pressure in accordance with the slip ratio $S_1$ is applied to the clutch 60, so that the clutch 60 is engaged at the clutch pressure. Consequently, a clutch torque Tc is produced in the clutch 60. The clutch 60 is provided in parallel with the carrier 55 and the second sun gear 53 of the central differential 50. Accordingly, the clutch torque Tc is transmitted from the second sun gear 53 to the carrier 55 to increase the torque to the front wheels. To the contrary, the torque to the rear wheels is reduced to eliminate slipping, thereby improving driveability to ensure good operability and safe driving.

When the slip ratio S becomes smaller than the set value SI, the differential operation restricting torque becomes maximum by the pressure of the oil in the clutch 60. Thus, the carrier 55 is directly engaged with the second sun gear 53 to lock the central differential 50. Thus, the four-wheel driving is established in accordance with the torque distribution corresponding to the axle loads of the front and rear wheels. Thus, the torque distribution is continuously controlled in accordance with the slip condition for preventing the slipping of the wheels.

In the system, the front drive shaft and the front differential can be disposed outside the transmission case. In addition, sproket wheels and chain can be used in place of the reduction gear 17.

In accordance with the present invention, a plurality of the pinion sets are equiangularly disposed in the planetary gear device. Thus, the balance of mass among the pairs of the pinions are ensured during the operation, thereby improving durability of the bearings and reducing noise and vibration of the central differential.

Further, since both pinions of each pair are in the same phase and a plurality of the pinion sets are equiangularly disposed by determining the number of teeth and measurements of gears, assembling and workability of the planetary gear device are improved. It is possible to simplify manufacturing of the gears and reduce the parts of the pinions.

Since measurements of the gears between the first sun gear and pinion and between the second sun gear and pinion can be preferably changed, wide controlling of the torque distribution can be performed. Thus, operability and driveability of the vehicle are accurately and properly controlled, thereby improving efficiencies thereof.

Each of the carrier and the shaft of the pinion is supported at both sides thereof, so that durability and reliability of the members are improved.

Furthermore, a part of the fluid operated multiple-disk friction clutch is used for the central differential, thereby reducing the length of the device in the axial direction.

While the presently preferred embodiment of the present invention have been shown and described, it is to be understood that this disclosure is for the purpose of illustration and that various changes and modifications may be made without departing from the scope of the invention as set forth in the appended claims.

What is claimed is:

1. In a central differential, comprising a planetary gear device, for a four wheel drive motor vehicle for distributing torque at a predetermined ratio, comprising an input member operatively connected to a power source for inputting input torque, a front torque transmitting member for transmitting a distributed torque to front wheels of the vehicle, and a rear torque transmitting member for transmitting another distributed torque to rear wheels of the vehicle, the improvement in the differential wherein the planetary gear device comprises:
   a first sun gear;
   a second sun gear disposed coaxially with an axis of said first sun gear;
   a carrier disposed coaxially with said axis;
   a first planetary pinion meshed with said first sun gear;
   a second planetary pinion meshed with said second sun gear;
   the number of teeth of said first planetary pinion being equal to the number of teeth of said second planetary pinion, and both said pinions being different in module;
   a plurality of pinion sets, each comprising said first planetary pinion and said second planetary pinion formed integrally with each other in same phase, and equiangularly disposed around said axis and rotatably supported on said carrier;
   the difference between the number of teeth of said first sun gear and the number of teeth of said second sun gear integrally multiplied by the number of said pinion sets is an integer;
   said carrier operatively connected to one of said torque transmitting members;
   one of said sun gears being coaxially connected to another of said torque transmitting members; and
   the other of said sun gears being coaxially connected to the input member so as to improve assembling and workability of the planetary gear device.

2. The central differential according to claim 1, further comprising
   differentiation restricting means for restricting differential operations of said differential.

3. The central differential according to claim 2, wherein
   said differential restricting means is a fluid-operated multiple disk clutch disposed between said torque transmitting members.

4. The central differential according to claim 1, wherein
   said front torque transmitting member is a reduction gear coaxial with said axis and connected to said carrier.

5. The central differential according to claim 1, wherein
   said rear torque transmitting member is a rear drive shaft connected to said second sun gear.

* * * * *